United States Patent
Ma

(10) Patent No.: US 10,245,809 B2
(45) Date of Patent: Apr. 2, 2019

(54) HETEROGENEOUS COMPOSITES AND PRODUCTS THEREOF

(71) Applicant: Pu Feng Enterprise Corp., Taichung Hsien (TW)

(72) Inventor: Shui-Yuan Ma, Taichung (TW)

(73) Assignee: Pu Feng Enterprise Corp., Taichung Hsien (TW)

( * ) Notice: Subject to any disclaimer, the term of this patent is extended or adjusted under 35 U.S.C. 154(b) by 175 days.

(21) Appl. No.: 15/283,426

(22) Filed: Oct. 2, 2016

(65) Prior Publication Data

US 2018/0093452 A1  Apr. 5, 2018

(51) Int. Cl.
| | |
|---|---|
| *B32B 7/12* | (2006.01) |
| *B32B 5/02* | (2006.01) |
| *B32B 15/04* | (2006.01) |
| *B32B 27/06* | (2006.01) |
| *A63C 17/00* | (2006.01) |
| *A45C 5/02* | (2006.01) |
| *A45C 5/03* | (2006.01) |

(52) U.S. Cl.
CPC ............... *B32B 7/12* (2013.01); *A45C 5/02* (2013.01); *A63C 17/00* (2013.01); *B32B 5/02* (2013.01); *B32B 5/022* (2013.01); *B32B 15/04* (2013.01); *B32B 27/06* (2013.01); *A45C 2005/037* (2013.01); *B32B 2439/46* (2013.01); *B32B 2571/00* (2013.01)

(58) Field of Classification Search
CPC .. B32B 7/12; B32B 5/02; B32B 5/022; B32B 15/04; B32B 27/06
See application file for complete search history.

(56) References Cited

U.S. PATENT DOCUMENTS

| | | |
|---|---|---|
| 2003/0008105 A1 | 1/2003 | Haack et al. |
| 2005/0255771 A1 | 11/2005 | Chetty et al. |
| 2013/0233972 A1 | 9/2013 | Alderliesten et al. |
| 2013/0244526 A1* | 9/2013 | Wyner .................. B32B 5/022 |
| | | 442/370 |

FOREIGN PATENT DOCUMENTS

| | | |
|---|---|---|
| JP | 48-007257 | 6/1973 |
| JP | 5338765 A | 4/1978 |
| JP | 2015063018 A | 4/2015 |
| JP | 2015063019 A | 4/2015 |
| KR | 20100105106 A | 9/2010 |
| TW | 505842 B | 10/2002 |

* cited by examiner

*Primary Examiner* — Lawrence D Ferguson
(74) *Attorney, Agent, or Firm* — Alan D. Kamrath; Kamrath IP Lawfirm, P.A.

(57) ABSTRACT

A heterogeneous composite has a first layer which includes a fiber layer, a metal layer, a plastic layer or a combination thereof, a second layer which includes a fiber layer with a plastic layer, or a fiber layer with a non-woven cloth layer, and a base layer which is a thermoplastic layer. The first layer and the second layer are respectively mounted on the base layer by a glue layer, and the compressive strength value between the first layer and the second layer is less than 20%. The base layer enhances strength of the whole composite, and the heterogeneous composite provides a beautiful and competitive product.

10 Claims, 4 Drawing Sheets

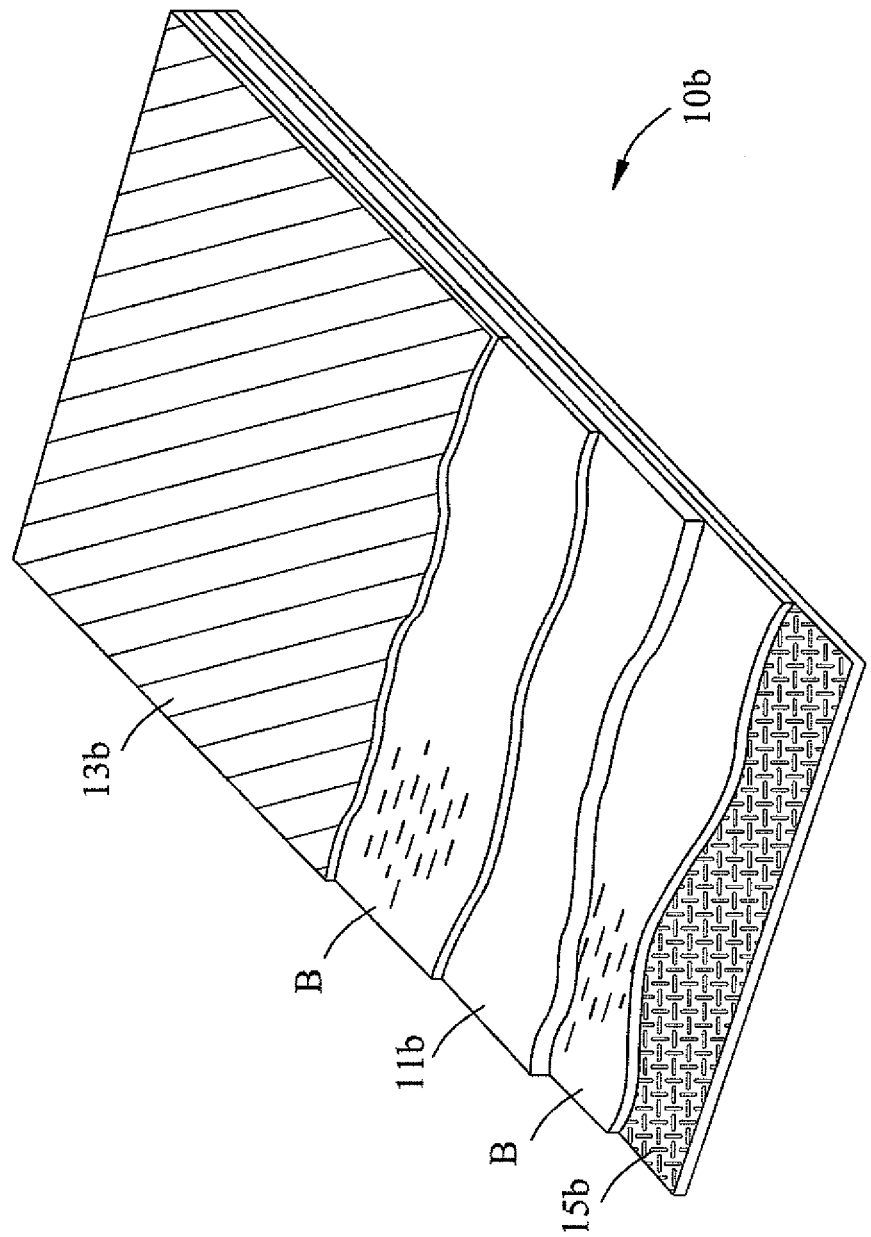

HETEROGENEOUS COMPOSITES AND PRODUCTS THEREOF

BACKGROUND OF THE INVENTION

1. Field of Invention

The present invention is related to a heterogeneous composite, especially to a stacking heterogeneous material and products thereof.

2. Description of the Related Art

Hard-shell luggage is a leading tendency of luggage case manufacture. Materials for making hard-shell luggage may be plastic or metal. Plastic and metal material could be formed in any shapes, and such materials show high-strength, are durable and have waterproof properties, so that such luggage cases are always popular between consumers.

Plastic hard-shell luggage could be classified as traditional plastic cases and composite plastic cases which are made by one layer of plastic plate or multiple plates. However, the structural strength of such cases are weak and couldn't bear hard impact.

Recently, plastic fibers are used in the luggage case to promote strength. Multiple fiber layers are cross-stacked to increase the structural strength, but such manufacture process is at a high cost and the technical skill is more difficult than the traditional one. The luggage cases made by multiple fiber layers also show some disadvantages, such as fibers broken in the layers, fiber dislocation, and creases formed when the fiber layers are bent. The above problems make the luggage cases have a high price and could not be popular.

Hard-shell luggage cases made by metal also show some disadvantages, such as a high price, being heavy and can't be sewn. Further, when the metal luggage is under a strong hit, the case can't be recovered.

Therefore, there is a need for providing novel luggage made by a strong strength material, to overcome the above-mentioned disadvantages.

SUMMARY OF THE INVENTION

To solving the above-mentioned disadvantages, the present invention is related to a heterogeneous composite and products thereof.

The present invention, related to a heterogeneous composite, comprises:

a first layer which includes a fiber layer, a metal layer, a plastic layer or a combination thereof, a second layer which includes a fiber layer with a plastic layer, or a fiber layer with a non-woven cloth layer, and a base layer which is a thermoplastic layer, with the first layer and the second layer respectively mounted on the base layer by a glue layer, and with the compressive strength value between the first layer and the second layer being less than 20%.

The present invention shows the following advantages, such as:

1. The base layer provides stronger strength of a whole heterogeneous composite to solve problems of a weak structure of the conventional material. Further, the material and the thickness of the base layer may be chosen depending on the requirement of strength, tensile strength and impact resisting strength, so that the heterogeneous composite is a competitive product.

2. Due to the compressive strength of the first layer and the second layer being similar, the post-process of the heterogeneous composite would be convenient, and warping, delamination, and pattern wrinkles formed between the process would be prevented.

3. In one embodiment of the present invention, the metal layer is used and is stacked on the base layer and the fiber layer. The base layer provides a proper support of the whole composite, and the fiber layer also provides proper support and strength of the whole composite, so that the whole composites show a better strength and an enhanced structure than the conventional material, and so that the whole composites are lightweight.

For example, the proportion of aluminum is 2.7 g/cm3. When a thickness of 1 mm aluminum sheet is used, the weight of each square meter is 2700 g. However, in accordance with the present invention, the heterogeneous composite may comprise a thickness of 0.2 mm aluminum sheet and a thickness of 0.8 mm fiber layer respectively mounted on the base layer. Therefore, the final thickness of the heterogeneous composite is also 1 mm, but the total weight is only 1400 g and the heterogenous composite shows a structural strength.

Furthermore, the fiber layer and the base layer provide resilient properties to solve the problem when the metal luggage is under a strong hit and the case can't be recovered.

4. The fiber layer may use different materials depending on the needs, such as different fiber materials, colors, patterns or knit methods, to provide a beautiful and different appearance. The fiber layer shows a high specific surface, and could be mounted on other materials only by glue or by being hot-press.

5. The heterogeneous composite is made by stacking different material sheets, so that the appearance, strength, and thickness of the heterogeneous composite varies depending on the consumers' need.

6. The manufacturing process of the heterogeneous composite may be made by being hot-press without a mold and may be made directly by machine sewing. Therefore, the cost will be reduced, and the products made by the heterogeneous composite will be varied.

BRIEF DESCRIPTION OF THE DRAWINGS

FIG. 3 is a perspective view of a third preferred embodiment of the present invention.

DETAILED DESCRIPTION OF THE INVENTION

Figure 1:
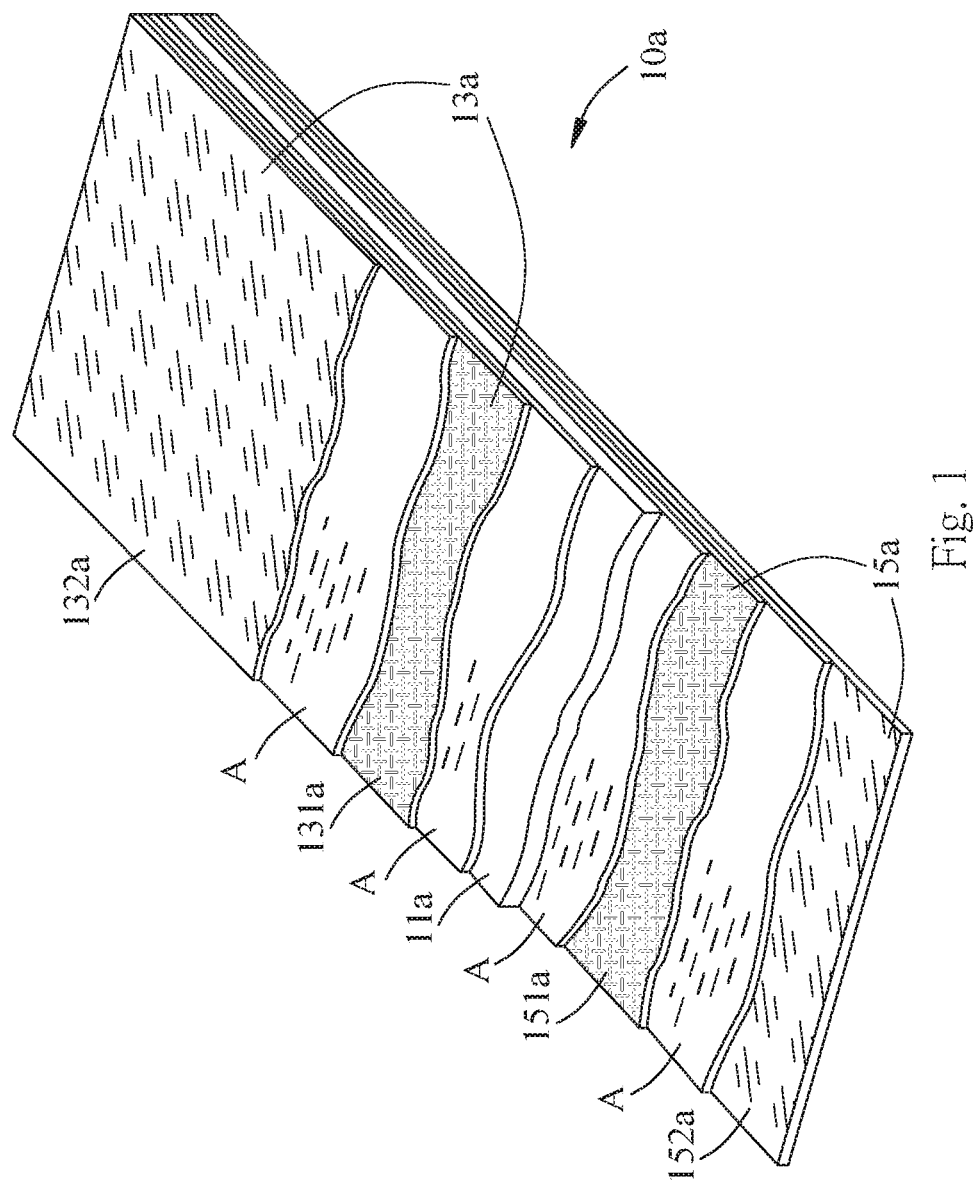
FIG. 1 is a perspective view of a first preferred embodiment of the present invention.

With reference to FIG. 1, a perspective view of a first embodiment, a heterogeneous composite 10a in accordance with the present invention is shown. The heterogeneous composite 10a sequentially has a first layer 13a, a base layer 11a and a second layer 15a. Each layer is combined by a glue layer (A).

In the first embodiment of the present invention, the first layer 13a has a fiber layer 131a and a plastic layer 132a. The fiber layer 131a shows a knit pattern and has a stronger strength than the conventional one. In a preferred embodiment, the thickness of the fiber layer 131a is about 0.2 mm to 0.5 mm, and the material of the fiber layer 131a may be, but is not limited to, polyethylene (PE), polypropylene (PP), polyethylene terephthalate (PET), carbon fiber, Kevlar fiber, glass fiber, nylon, or natural fiber.

The plastic layer 132a is mounted on the top surface of the fiber layer 131a to form a protection or a glossy top. In addition, the plastic layer 132a may have different patterns made by thermal sublimation or print. In a preferred embodiment, the thickness of the plastic layer 132a is about 0.05 mm to 0.15 mm, and the material of the plastic layer 132a may be, but is not limited to, polypropylene (PP), Nylon, polyurethane (PU), thermoplastic urethane (TPU), polyethylene terephthalate (PET), Syrlyn® or Pebox®, polycarbonate (PC) or polymethylmethacrylate (PMMA).

The second layer 15a also has a fiber layer 151a and a plastic layer 152a, and a glue layer A is mounted between the fiber layer 151a and the plastic layer 152a. The materials used for making the fiber layer 151a and plastic layer 152a are the same as described above.

The base layer 11a is one of the main characteristics in the present invention. The base layer 11a is mounted between the first layer 13a and the second layer 15a, and enhances the strength of the heterogeneous composite 10a in the present invention. In a preferred embodiment, the base layer 11a may be made by thermoplastic, and the thermoplastic may be, but is not limited to, polyethylene terephthalate (PET), polypropylene (PP), polyethylene (PE), Nylon, polycarbonate (PC) or polymethylmethacrylate (PMMA). The thickness of the base layer 11a may be 0.2 mm to 5.0 mm.

The glue layer (A) may be, but is not limited to, co-polyolefin, co-polyamide, co-polyester or thermoplastic polyurethane. The glue layer (A) may be a transparent glue or a transparent membrane which depends on the materials of the fiber layer 131a. For example, when the fiber layer 131a is made of a polyethylene fiber and the base layer 11a is a polyethylene plate, the glue layer (A) may be co-polyolefin to make a better connection of the fiber layer 131a and the base layer 11a.

To make the strength balance between the two sides of the base layer 11a, the compressive strength between the first layer 13a and the second layer 15a may be 0 to 20%. The compressive strength includes anti-bending, tensile strength and impact resisting strength. When the stress of the first layer 13a and the second layer 15a is the same or similar, the post-process of manufacture would be convenient and warping, delamination, and pattern wrinkles formed between processes would be prevented. Further, the material, thickness of the layers and Denier of fiber layer may be adjusted by considering the balance of compressive strength.

In one embodiment of the present invention, the material of the first layer 13a and the second layer 15a are different. For example, the fiber layer 131a of the first layer 13a is 1100 Denier, and the thickness is 0.2 mm. The thickness of the plastic layer 132a is 0.1 mm, the corresponding fiber layer 151a could be 900 to 1300 Denier and the thickness of the plastic layer 152a could be 0.05 to 0.15 mm. By the structure described in the example, the compressive strength of the base plate 11a could be balanced, and warping, delamination and pattern wrinkling would be prevented.

In a preferred embodiment of the present invention, the glue layer (A) may be mounted between the fiber layer 131a and the fiber layer 151a by semi-impregnation. The term, semi-impregnation, means the glue layer (A) may permeate between the fiber layer 131a and 151a. The glue layer (A) may permeate about ⅓ to ⅔ volume of each fiber layer 131a and 151a without glue leakage. The method for semi-impregnation may be operated by stacking the fiber layers 131a, 151a and the glue layer (A), and then, connecting each layer by the parameter of heat compressing to make the glue layer (A) semi-impregnated into the fiber layer 131a and 151a.

With FIGS. 2a to 2d, in a first preferred embodiment of the present invention, the arrangement of each layer may be varied depending on the balance of compressive strength of each layer.

Figure 2A:
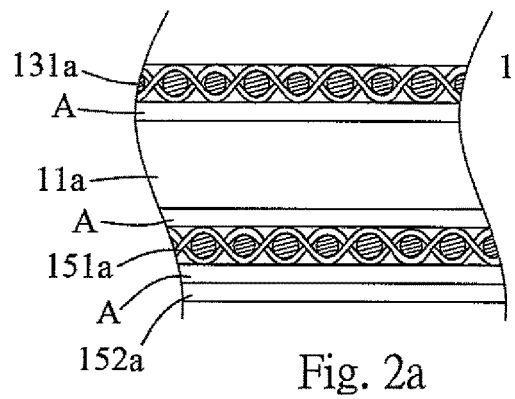
FIGS. 2a to 2d are sectional views of the first preferred embodiment of the present invention.
Figure 2B:
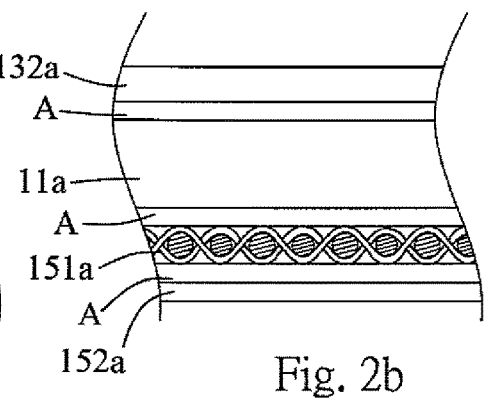
Figure 2C:
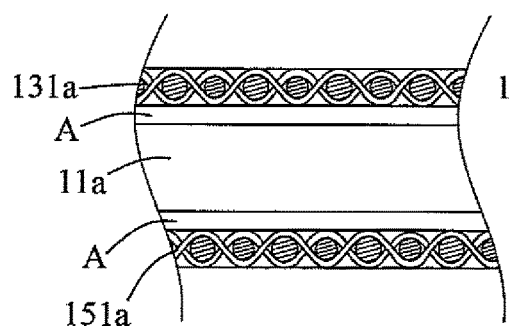
Figure 2D:
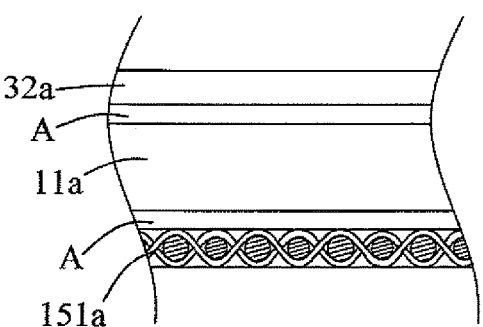
Figure 2E:
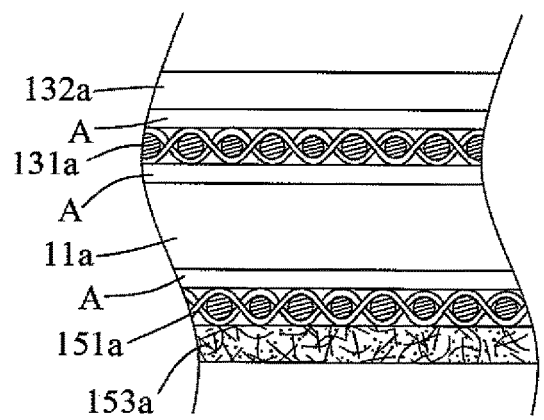
FIG. 2e is a sectional view of a second preferred embodiment of the present invention.

With FIG. 2e, in the second preferred embodiment of the present invention, the plastic layer 132a may be replaced by a non-woven cloth 153a which is mounted on the fiber layer 131a by a pinprick to make the fiber of non-woven cloth 153a partially cross-mounted on the fiber layer 131a. Optionally, the non-woven cloth 153a may be mounted on the fiber layer 131a by glue.

With FIG. 3, in a third preferred embodiment of the present invention, a heterogeneous composite 10b shows similar structure to the first embodiment and the second embodiment. However, the first layer 13a is replaced by a metal sheet 13b, and the thickness of metal sheet is about 0.1 to 0.5 mm. The material of the metal sheet 13b may be, but is not limited to, aluminum, magnuminium alloys, stainless steel, chromium-plated brass or titanium alloy. The second layer 15a may be replaced with a fiber layer 15b, and the material may be, but is not limited to, carbon fiber, glass fiber, polyester fiber, Nylon fiber or natural fiber. The base layer 11b is thermoplastic and may be polyethylene (PET), polypropylene (PP), polyethylene (PE), Nylon, polycarbonate (PC) or polymethylmethacrylate (PMMA).

To combine the metal sheet 13b and the plastic base layer 11b, the glue layer (B) may comprise polyolefin, polyamide or polyester. The glue layer (B) between the second layer 15b and the base layer 11b also could be polyethylene (PET), polypropylene (PP), polyethylene (PE), Nylon, polycarbonate (PC) or polymethylmethacrylate (PMMA), and co-polyolefin, co-polyamide, co-polyester or thermoplastic polyurethane described in the first preferred embodiment.

To balance the compressive strength of the first layer 13a and the second layer 15b which is made of plastic plate or natural fiber, the first layer 13a may be a thin aluminum sheet with 0.2 mm thickness, and the second layer 15b may be a fiber layer of 1300 to 1800 Denier with 0.2 to 0.5 mm thickness. Therefore, the compressive strength beside the base layer 11b will be balanced.

The preferable methods for manufacturing the heterogeneous composites, is to stack each layer, to choose the material of each layer, to set up the parameter of heat-pressing according to the material of each layer, to press the stacking layers into a 50° C. hot-pressing bed, to heat up to about 150 to 178° C. with pressure of 14 to 20 kg/cm2 for 3 to 6 minutes, and then to cool down to 50° C. to obtain the final products.

Figure 4A:
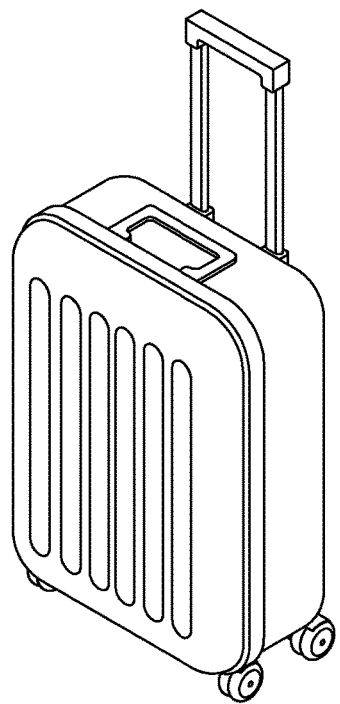
FIGS. 4a, 4b and 4c are views of a luggage case, a roller skate, and protective clothing applying the heterogenous composite of the present invention.
Figure 4B:
Figure 4C:

The heterogeneous composite may be applied in various fields, such as luggage cases (shown in FIG. 4a), protective clothing (shown in FIG. 4c), roller skates (shown in FIG. 4b), in-line skates or housings of notebooks.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A heterogeneous composite sequentially comprising:
   a first layer which includes a fiber layer, a metal layer, a plastic layer or a combination thereof,
   a second layer which includes a fiber layer with a plastic layer, or a fiber layer with a non-woven cloth layer, and
   a base layer which is a thermoplastic layer, wherein the first layer and the second layer are respectively mounted on the base layer by a glue layer, wherein a compressive strength value between the first layer and the second layer is less than 20%, wherein:
   the base layer includes polyethylene terephthalate (PET), polypropylene (PP), polyethylene (PE), Nylon, polycarbonate (PC) or polymethylmethacrylate (PMMA),
   the fiber layer includes polyethylene (PE), polypropylene (PP), polyethylene terephthalate (PET), carbon fiber, Kevlar fiber, glass fiber, nylon, or natural fiber,
   the plastic layer includes polypropylene (PP), Nylon, polyurethane (PU), thermoplastic urethane (TPU), polyethylene terephthalate (PET), polycarbonate (PC) or polymethylmethacrylate (PMMA),
   the metal layer includes aluminum, magnuminium alloys, stainless steel, chromium-plated brass or titanium alloy, and
   the glue layer includes co-polyolefin, co-polyamide, co-polyester, thermoplastic polyurethane, polyolefin, polyamide or polyester.

2. The heterogeneous composite of claim 1, wherein a thickness of the base layer is about 0.2 to 3.0 mm, a thickness of the fiber layer or the non-woven cloth layer is about 0.2 to 0.5 mm, a thickness of the plastic layer is about 0.05 to 0.15 mm, and a thickness of the metal layer is about 0.1 to 0.5 mm.

3. The heterogeneous composite of claim 1, wherein the glue layer permeates about $1/3$ to $2/3$ volume of the fiber layer.

4. The heterogeneous composite of claim 2, wherein the glue layer permeates about $1/3$ to $2/3$ volume of the fiber layer.

5. The heterogeneous composite of claim 1, wherein the non-woven cloth layer is mounted on the fiber layer by a pinprick which makes the non-woven cloth layer partially cross-mounted on the fiber layer.

6. The heterogeneous composite of claim 2, wherein the non-woven cloth layer is mounted on the fiber layer by pinprick which makes the non-woven cloth layer partially cross-mounted on the fiber layer.

7. The heterogeneous composite of claim 1, wherein the plastic layer has a different pattern made by sublimation or print.

8. A luggage case, comprising the heterogeneous composite claimed in claim 1.

9. A roller skate, comprising the heterogeneous composite claimed in claim 1.

10. A protective clothing, comprising the heterogeneous composite claimed in claim 1.

* * * * *